Sept. 27, 1938.    H. COANDA    2,131,472
MOTOR
Original Filed Jan. 10, 1936    3 Sheets-Sheet 1

INVENTOR:
HENRI COANDA
BY Haseltine Lake & Co
ATTORNEYS

Sept. 27, 1938.    H. COANDA    2,131,472
MOTOR
Original Filed Jan. 10, 1936    3 Sheets-Sheet 2
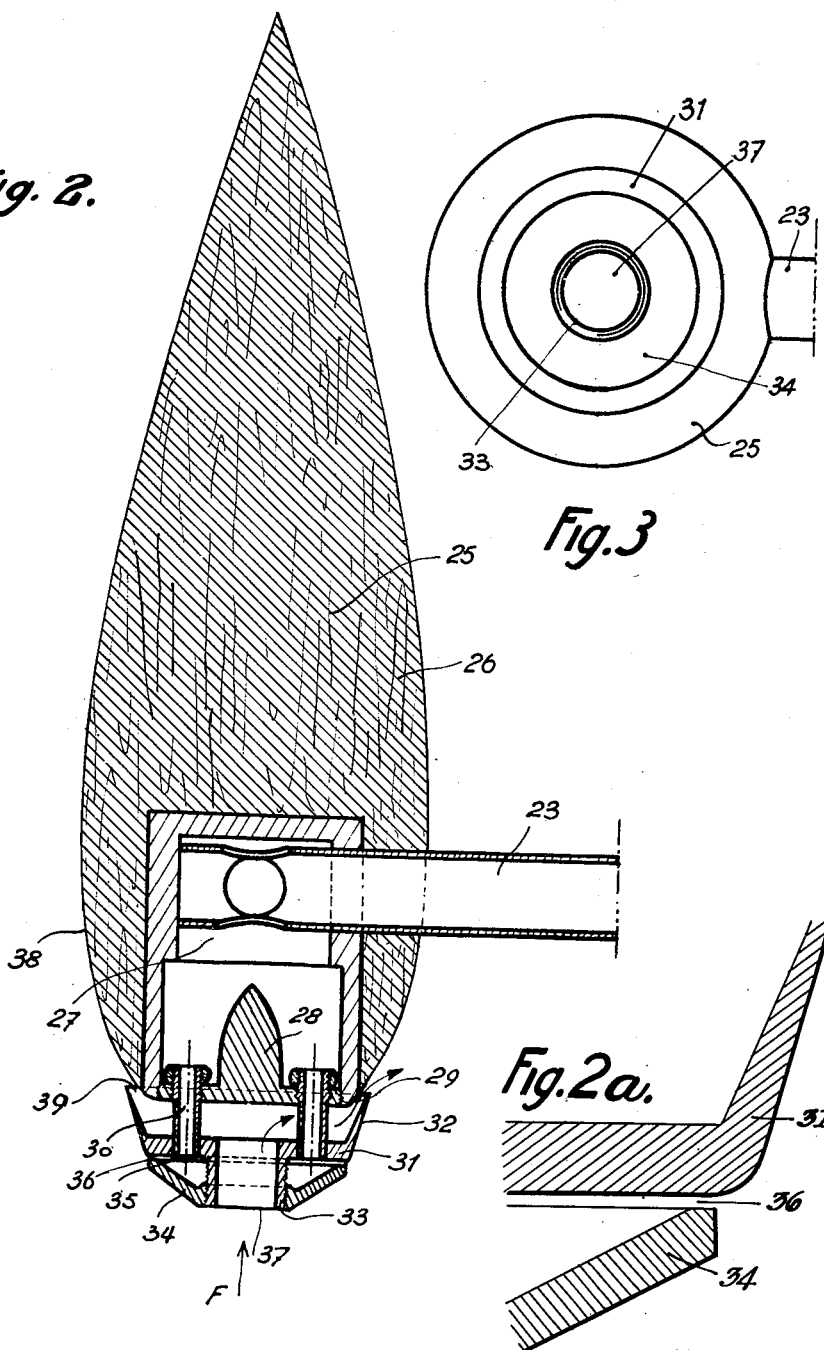
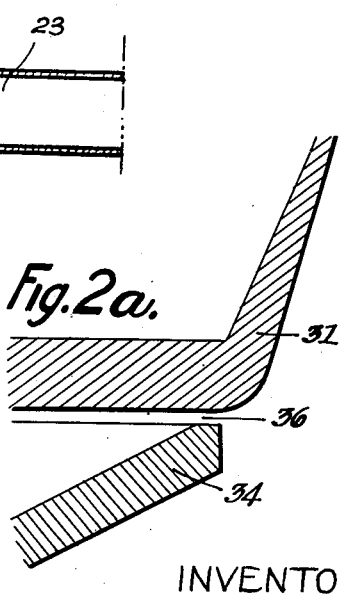
INVENTOR:
HENRI COANDA
BY Haseltine Lake & Co.
ATTORNEYS Sept. 27, 1938.  H. COANDA  2,131,472
MOTOR
Original Filed Jan. 10, 1936  3 Sheets-Sheet 3
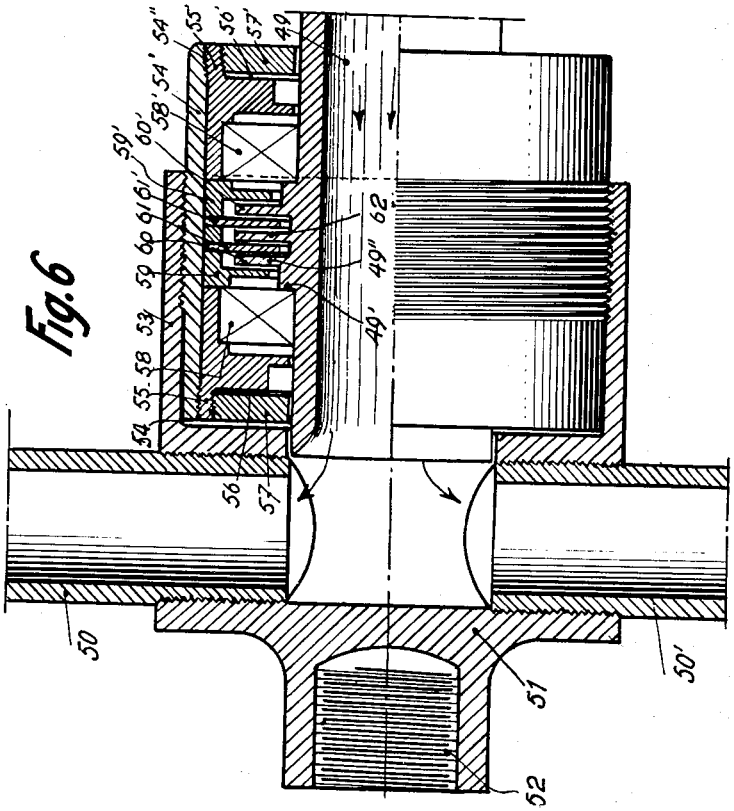
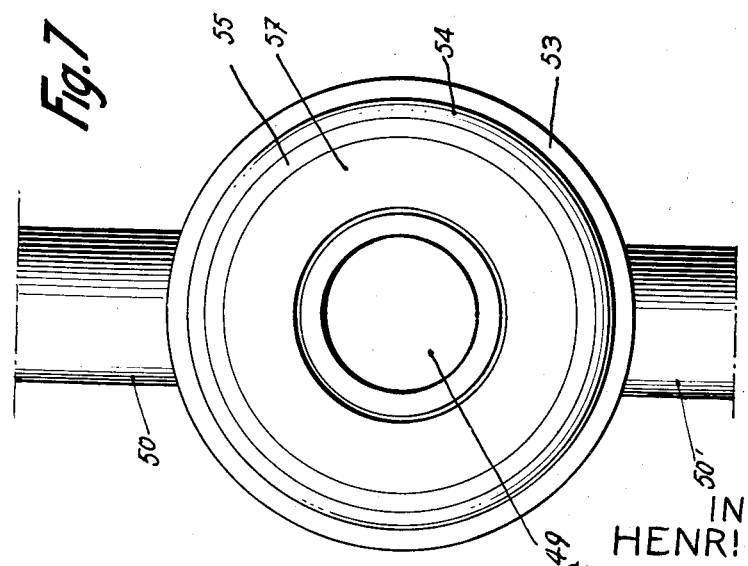
INVENTOR:
HENRI COANDA
BY Haseltine, Lake & Co.
ATTORNEYS Patented Sept. 27, 1938

2,131,472

UNITED STATES PATENT OFFICE 2,131,472

MOTOR

Henri Coanda, Clichy, France

Original application January 10, 1936, Serial No. 58,471. Divided and this application August 13, 1936, Serial No. 95,819. In France January 16, 1935

10 Claims. (Cl. 170—172)

This application is a division of my U. S. patent application Ser. No. 58,471, filed January 10, 1936.

The invention relates to motors operated by a fluid under pressure, and more particularly motors of the kind in which said fluid acts directly by escaping into the atmosphere.

The object of the present invention is to provide a motor of this kind which is better adapted to meet the requirements of practice than motors made up to now.

The motor according to the present invention consists essentially in the combination with a shaft and two radial arms carried by said shaft of propellers mounted on the ends of said arms and consisting each of a streamlined body having its axis at right angles to said arms, said body being provided with an inner chamber and an outlet for said chamber formed by a narrow annular slot in the wall of said body along a transverse plane thereof. According to an essential feature of my invention, the rear outlet edge or lip of said slot is of convex rounded shape and tangent to the outlet direction of said slot, whereas the front edge or lip directly makes an angle with said direction. Fluid under pressure is fed to said chamber through said tubes.

Another feature of the invention lies in the provision of special lubricating means for this device.

These and other features of the present invention will be hereinafter described, with reference to the accompanying drawings, given merely by way of example, and in which:

Fig. 2 is a detail view showing in section one of the propellers employed in connection with the motor shown by Fig. 1;

Fig. 2a is a view on a larger scale of a portion of Fig. 2;

Fig. 3 shows the propeller of Figs. 1 and 2 in front elevation;

Fig. 6 is an axial sectional view of a joint device for a motor according to the present invention;

Fig. 7 is an end view corresponding to Fig. 6.

Figure 1:
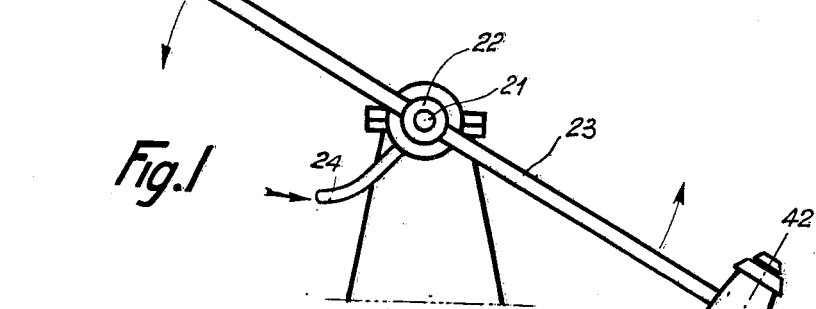
Fig. 1 is a diagrammatic front view of a motor according to the present invention.

In the embodiment of Fig. 1, a sleeve 22, fitted on the shaft 21 of the motor, receives the motive fluid (gas under pressure) from tube 24 and distributes it to arms or tubes 23, at the ends of which the propelling elements are fixed.

These propelling elements 25 each include a streamlined body 26 in which is provided an inner chamber 27 to which the gas under pressure is fed through tubes 23.

This inner chamber 27 is closed at its front end by a cap 28 screwed at 29. This cap 28 carries arms or tubes 30, fixed thereto for instance by screwing and rigid with a crown-shaped member 31 having inclined outer faces shown at 32 and including a frontward extension 33. On this extension 33, a ring 34 is screwed in an adjustable manner so as to permit of placing it at any desired distance from the outlets 35 of tubes 30, thus leaving between crown-shaped member 31 and the rear face of ring 34 a narrow annular interval or slot 36. The gas under pressure fed to the inner chamber 27 through arm or tube 23 is fed through tubes 30 to the space between part 31 and part 34. It escapes through annular interval 36 and, due to the special shape of the outlet (walls 32 being jointed to gap 36 by a curved surface tangent to said outlet as more clearly visible in Fig. 2a), this gas, on escaping outwardly, flows along wall 32.

Furthermore, ring 34 is open in its central part, at 37, so that air can flow through said passage 37, when the propeller is moving, and escape rearwardly through the annular space existing at 29 between the rear edge of part 32 and the body 26 of the propeller.

This system works in the following manner:

The gas escaping as above explained through annular interval 36 flows in a rearward direction along the wall 32 of element 31. This causes a suction at the front of part 32, the degree of said suction depending upon the expansion of the gas. Air is thus caused to rush from the front toward the lateral walls of the propeller. This increases the suction in the space ahead of the front end of the propeller so that the latter tends to move toward the zone of reduced pressure. The movement of the propeller is caused by the fact that a suction is continuously created ahead of said propeller.

Furthermore, the air that flows through passage 37 and escapes through annular space 29 also creates a suction along walls 38 of the body, this suction also cooperating in creating and maintaining the movement.

Figure 4:
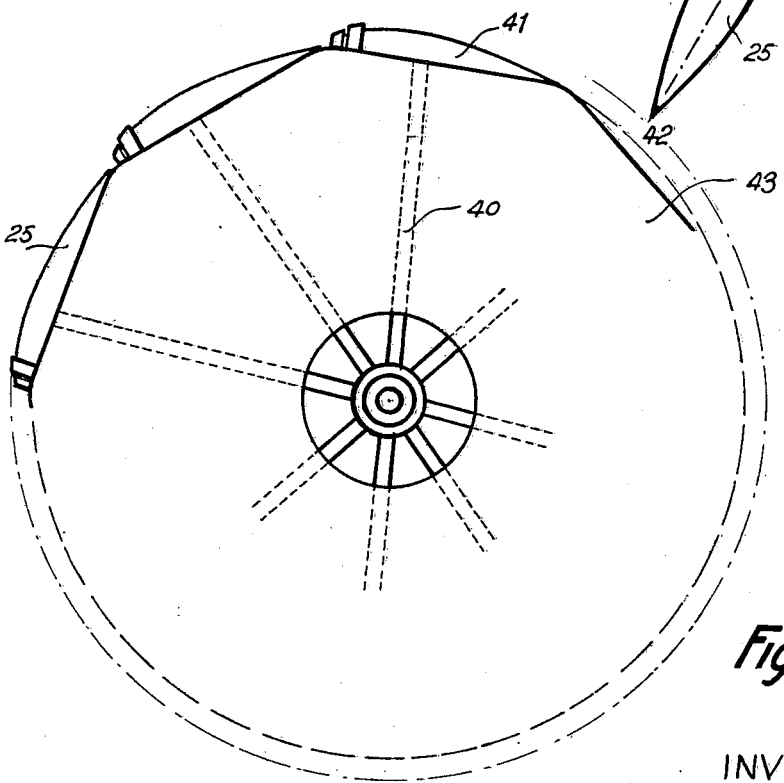
Fig. 4 shows a modification of the motor according to the present invention, including a plurality of propellers distributed over the periphery of a flywheel.

In Fig. 4 I have shown another embodiment of the invention in which, in order to avoid any risk of having the propellers torn off under the effect of the centrifugal force and to reduce the resistance to rotation, the hollow tube-arms 23 are replaced by a flywheel 43, provided with a plurality of passages 40 through which the gas under pressure is fed to corresponding propellers 41, suitably arranged about the periphery of said flywheel. In this case, the propellers consist of one half of the structure shown in Fig. 2, said half projecting outwardly in the radial direction, from the periphery of flywheel 43.

Figure 5:
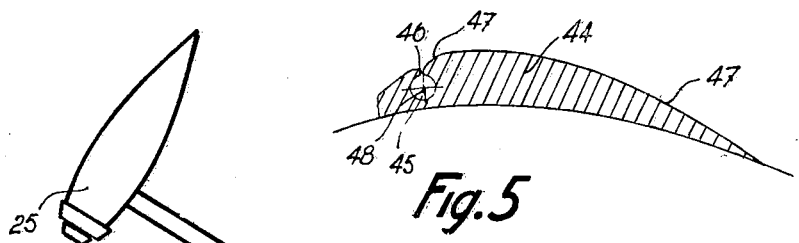
Fig. 5 is a diagrammatical view of a propeller to be used in a motor of this kind.

In this case, the propellers may be given the form shown by Fig. 5, in which the body 44 is in the shape of a thick blade provided with an inner chamber 45 communicating with the atmosphere through a slot 46 one of the edges or lips of which forms a rounded projection 47 adapted to guide the outflowing fluid as above explained.

This propelling element 44 may be mounted adjustable about its axis 48.

In the embodiments of Figs. 4 and 5 the operation is the same as above explained, with this difference that a suction is produced which corresponds to one half of that obtained with elements such as those shown at 25 in Fig. 1.

In Figs. 6 and 7, I have shown a packing arrangement to be inserted between two systems of conduits, one of these systems consisting of a tube 49 through which fluid under pressure is supplied to the motor and which is either the end of sleeve 22 or a part fixed thereto, and the other system consisting of two tubes 50 and 50' for feeding this fluid to the propellers, and which therefore are equivalent to arms or tubes 23 of the preceding examples. The part 51 which carries these tubes 50 and 50' is journalled around the end of delivery tube 49, that is to say about the axis of sleeve 22. Of course, the arrangement that will be hereinafter explained could as well apply to the case in which the relative movements are inverse. It might also apply to the case in which more than two tubes 50 and 50' are provided.

As shown by Fig. 6, one of the ends of part 51 constitutes a kind of socket 52 adapted to be fitted on the end of a shaft or the like. The other end of piece 51 constitutes a cylindrical sleeve 53, provided with internal screw threads. In this sleeve 53 there is screwed a cylindrical part 54, screw-threaded at both ends, at 54' and 54''. On these parts 54' and 54'' are screwed inner rings 55 and 55', which hold between them an annular member 59, also fitting exactly inside cylindrical casing 54. On the respective outer ends of these rings 55 and 55', packing members 56 and 56' are fixed by means of stuffing box rings 57 and 57', screwed in the respective ends of rings 55 and 55'. Two roller bearings 58 and 58' are interposed between tube 49 and cylindrical casing 54. Each of these roller bearings, say 58, is maintained axially between a shoulder of the corresponding ring, 55, on one side, and a shoulder 49' of tube 49 and an edge of member 59, on the other side. Annular projections, such as 61 and 61' on the one hand and 60, 62, 60' on the other hand, carried by member 59 and tube 49 on the respective inner and outer faces thereof, engage between one another in a baffle-like manner.

With such an arrangement, a fluid under pressure fed through tube 49 and flowing in the direction of the arrows toward tubes 50 and 50' cannot escape to the atmosphere through the gap existing between the end of tube 49 and the inner edge of part 51, because it would have to leak past the following elements: packing member 56, the roller bearing 58, the annular projections, arranged in baffle-like arrangement, of members 49 and 59 respectively, the second roller bearing, and packing member 56'.

Furthermore, between the annular projections arranged in baffle-like manner, there is oil which serves both to lubrify roller bearings 58 and 58' and to prevent the passage of the compressed fluid, said oil being prevented from leaking out owing to the presence of packing members 56 and 56'. In the course of the rotary movement of the system, this oil is applied outwardly toward the periphery of member 59 and it prevents the outflow of the fluid under pressure.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a motor having a rotary shaft, at least two propellers rigidly carried by said shaft at a distance therefrom and on either side thereof, the feature of having each of these propellers include a streamlined body having its axis at right angles to said shaft, said body being provided at its head with an inner chamber and an outlet for said chamber in the form of a narrow annular slot in the lateral wall at the head portion of the body, in a transverse plane thereof, the rear outlet edge or lip of said slot being of convex rounded shape and tangent to the outlet direction of said slot, whereas the front lip directly makes an angle with said direction, and means for feeding a fluid under pressure to said chamber.

2. In a motor having a rotary shaft, at least two radial tubes rigidly carried by said shaft on either side thereof, and at least two propellers carried by the outer ends of said tubes, the feature of having each of these propellers include a steamlined body having its axis at right angles to said tubes, said body being provided at its head with an inner chamber and an outlet for said chamber in the form of a narrow annular slot in the lateral wall of the head portion of said body, in a transverse plane thereof, the rear outlet edge or lip of said slot being of convex rounded shape and tangent to the outlet direction of said slot, whereas the front lip directly makes an angle with said direction, said tubes opening at their outer ends into said chambers respectively, and means for feeding a fluid under pressure to said tubes.

3. In a motor having a rotary shaft, at least two radial tubes rigidly carried by said shaft on either side thereof, and at least two propellers carried by the outer ends of said tubes, the feature of having each of said propellers include a streamlined body, having its axis at right angles to said tubes, said body being provided in the head portion thereof with an inner chamber and an outlet for said chamber in the form of a narrow annular slot in the lateral wall of the head portion of said body, in a transverse plane thereof, said slot opening outwardly into the atmosphere in a direction transverse to the axis of said body, the rear outlet edge or lip of said slot being of convex rounded shape and tangent to the outlet direction of said slot, whereas the front lip directly makes an angle with said direction, said radial tubes opening into the chambers of said propellers respectively, a stationary tube coaxial with said shaft adapted to feed a fluid under pressure and means for connecting in a fluidtight manner said last mentioned tube with both of the first mentioned tubes.

4. In a motor having a rotary shaft carrying rigidly several radial tubes on either side thereof and a rigid propeller body secured upon the outer end of each of said radial tubes, the combination of a stationary tube coaxial with said shaft adapted to feed a fluid under pressure through said radial tubes to the propeller bodies thereon, there being narrow transverse slots in the head portions of said bodies allowing the fluid to issue along said bodies so as to propel the same, means for connecting the stationary tube in fluidtight manner with said radial tubes including a hollow cylindrical casing rigid with said shaft and communicating with said tubes, rolling bearings interposed between said casing and said stationary tube, and a packing device interposed between said casing and said stationary tube including at least one stuffing box carried by one of these two last mentioned elements, and a plurality of annular extensions carried by the inner surface of said casing and the outer surface of said stationary tube, respectively, arranged adjacent to one another in baffle-like arrangement.

5. In a motor having a rotary shaft carrying rigidly several radial tubes on either side thereof and a rigid propeller body secured upon the outer end of each of said radial tubes, the combination of a stationary tube coaxial with said shaft adapted to feed a fluid under pressure through said radial tubes to the propeller bodies thereon, there being narrow transverse slots in the head portions of said bodies allowing the fluid to issue along said bodies so as to propel the same, means for connecting the stationary tube in fluidtight manner with said radial tubes including a hollow cylindrical casing rigid with said shaft and communicating with said tubes, said casing being closed at one end and coaxial with said shaft, rolling bearings interposed between said casing and said stationary tube, and a packing system interposed between said casing and said stationary tube including at least one stuffing box carried by one of these two last mentioned parts, there being a plurality of annular extensions carried by the inner surface of said casing and the outer surface of said stationary tube respectively disposed adjacent to one another in baffle-like arrangement, and oil in said casing, so constructed and arranged that said oil, on being driven outwardly against the inner periphery of said casing, completes the action of said baffle-like extensions.

6. In a motor having a rotary shaft, the combination of a flywheel carried by said shaft, a plurality of rigid propellers carried by the outer periphery of said flywheel, each of these propellers including a streamlined body, having its axis at right angles to said tubes, said body being provided in its head portion with an inner chamber and an outlet for said chamber in the form of a narrow annular slot in the lateral wall of the head portion of said body, in a transverse plane thereof, said slot opening outwardly into the atmosphere in a direction transverse to the axis of said body, the rear outlet edge or lip of said slot being of convex rounded shape and tangent to the direction of outflow of said slot, whereas the front lip makes directly a certain angle with said direction, and passages in said flywheel for feeding a fluid under pressure to said chambers, respectively.

7. In a motor having a rotary shaft, at least two radial tubes rigidly carried by said shaft on either side thereof, and at least two propellers carried by the outer ends of said tubes respectively, the feature of having each of these propellers include a streamlined body having its axis at right angles to its respective tube, said body being provided with an inner chamber and an outlet for said chamber in the form of a narrow annular slot in the lateral wall in the head portion of said body, in a transverse plane thereof, said slot opening outwardly into the atmosphere in a direction transverse to the axis of said body, the rear outlet edge or lip of said slot being of convex rounded shape and tangent to the outlet direction of said slot, while the front edge or lip directly makes an angle with said direction, said radial tubes opening at their outer ends into said chambers, respectively, said streamlined body being provided with an axial passage having a front axial opening in the central front part of said body and a rear annular opening in the lateral wall of said body behind said slot so as to allow atmospheric air to flow upon said wall and maintain the atmospheric air pressure upon the same wall behind said slot, and means for feeding a fluid under pressure to said tubes and cause said fluid to pass radially outward to said bodies through the tubes.

8. In a motor having a hollow shaft, a plurality of tubes directly mounted upon said shaft and projecting therefrom, and a plurality of moving bodies secured upon the projecting ends of said tubes, the combination of means for producing a partial vacuum in front of each of said moving bodies and simultaneously maintain behind the same the pressure of the ambient fluid, said means including upon each of the moving bodies an alar surface portion arranged transversely to the direction of movement of the body involved at the head portion thereof and having an anterior curved leading edge forming an extension of the posterior wall of a very narrow slot through which a fluid is adapted to issue under great pressure, and terminating in a trailing edge, said extension receding continuously in gradual manner from the axis of the slot to the trailing edge, means for supplying said fluid under pressure to each moving body, so as to produce in front of and along said extension a partial vacuum in a zone of expansion of said fluid, and means including conduits in each moving body for introducing ambient fluid from in front of the body to the posterior portion of said trailing edge and thereby maintain the ambient pressure on the body behind said trailing edge.

9. A rotary motor according to claim 8 wherein each moving body has a fusiform shape and is provided at the head portion thereof with two mutually screwed rings having spaced edge portions adjustably spaced apart to form the very narrow slot, the posterior ring having a larger diameter than the other ring and the anterior edge of said posterior ring forming the posterior edge of said slot, and wherein the means for conveying the fluid under pressure includes a hollow tube connected to the hollow shaft in a tight joint by means of one or more stuffing boxes containing rolling bearing means, a series of rings alternately fixed with respect to said shaft and said hollow tube so as to form a labyrinth joint, there being packings at the ends of said labyrinth joint, and a quantity of oil in said joint which serves to complete the tightness of the labyrinth joint during operation by being driven to the periphery within said joint by centrifugal force.

10. A rotary motor according to claim 8, wherein each moving body has a fusiform shape and is provided at the head portion thereof with two mutually screwed rings having spaced edge portions adjustably spaced apart to form the very narrow slot, the posterior ring having a larger diameter than the other ring and the anterior edge of said posterior ring forming the posterior edge of said slot, and wherein the means for conveying the fluid under pressure includes a hollow tube connected to the hollow shaft in a tight joint by means of one or more stuffing boxes containing rolling bearing means, a series of rings alternately fixed with respect to said shaft and said hollow tube so as to form a labyrinth joint, there being packings at the ends of said labyrinth joint, a quantity of oil in said joint which serves to complete the tightness of the labyrinth joint during operation by being driven to the periphery within said joint by centrifugal force, and a cylindrical sleeve screwed into a portion of the apparatus the assemblage of the labyrinth joint being mounted in said sleeve, the end rings of said joint being capable of being blocked and making said sleeve rigid.

HENRI COANDA.